B. H. SMITH.
SINGLE PHASE POWER FACTOR MEASURING DEVICE.
APPLICATION FILED JULY 3, 1914.
1,248,568.
Patented Dec. 4, 1917.
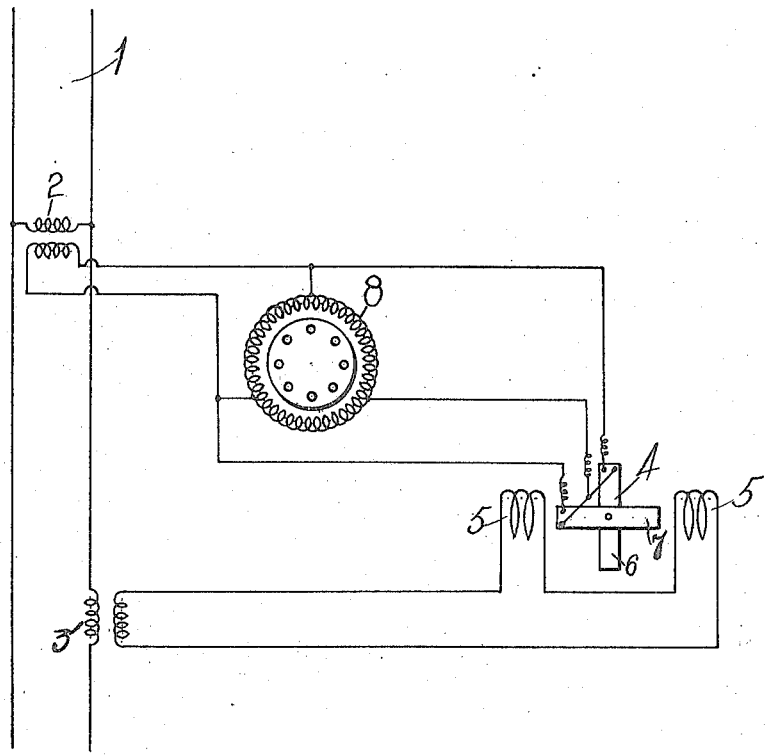
WITNESSES:
Clarence E. Myers
J H Procter
INVENTOR
Benjamin H. Smith
BY
Wesley E. Carr
ATTORNEY

UNITED STATES PATENT OFFICE.

BENJAMIN H. SMITH, OF TURTLE CREEK, PENNSYLVANIA, ASSIGNOR TO WESTINGHOUSE ELECTRIC AND MANUFACTURING COMPANY, A CORPORATION OF PENNSYLVANIA.

SINGLE-PHASE POWER-FACTOR-MEASURING DEVICE.

1,248,568.

Specification of Letters Patent.

Patented Dec. 4, 1917.

Application filed July 3, 1914. Serial No. 848,785.

*To all whom it may concern:*

Be it known that I, BENJAMIN H. SMITH, a citizen of the United States, and a resident of Turtle Creek, in the county of Allegheny and State of Pennsylvania, have invented a new and useful Improvement in Single-Phase Power-Factor-Measuring Devices, of which the following is a specification.

My invention relates to single-phase power-factor measuring devices, and has for its object to adapt a polyphase power-factor meter for operation on a single-phase circuit.

United States Patent No. 679,174 granted to P. M. Lincoln, covers a single-phase power-factor meter in which the phase relation of the current and the voltage of a circuit is indicated by the use of a stationary winding and two movable windings which are placed substantially at right angles to each other. The movable windings are so provided with external resistors and reactors that the currents in the two movable windings are substantially 90° out of phase. A meter of this type will indicate correctly when used on a circuit in which the frequency, wave form and voltage remain substantially constant. However, if the frequency, wave form or voltage changes, the phase relation of the movable coils will not remain constant, and the indications of the power factor of the circuit to which it is connected will not be correct. Polyphase power-factor meters have been constructed having movable coils which are so connected to the various phases of the circuit that the phase relation of the current in the movable coils will not be affected by changes in the frequency, wave form or voltage of the circuit.

I provide a phase converter which will supply voltages of constant phase relation to the movable windings of a polyphase power-factor meter. Thus, the correct indications of the power factor of a single-phase circuit may be determined when the frequency, wave form or voltage of a circuit changes from that for which the instrument is calibrated.

The single figure of the accompanying drawing is a diagrammatic view of circuits and apparatus embodying my invention.

A single-phase circuit 1, the power factor or phase relation of the current and voltage of which is desired, is provided with a voltage transformer 2 and a current transformer 3, substantially as shown in the drawing. A polyphase power factor meter 4 is provided with stationary current windings 5 and movable voltage windings 6 and 7. The windings 5 are connected to the secondary winding of the current transformer 3. The windings 6 and 7 are connected to the terminals of a phase converter or induction motor 8, substantially as shown. One phase of the phase converter 8 is connected to the secondary winding of the voltage transformer 2, for purposes hereinafter set forth.

The phase converter 8 has two of its terminals connected to the transformer 2 and all three of its terminals connected to the terminals of the windings 6 and 7 in order that the phase relation between the windings 6 and 7 may be substantially independent of small changes in frequency, wave form or voltage of the circuit.

When the voltage and the current of the circuit 1 are in phase, the reaction between the windings 5 and the winding 7 will be a maximum and that between the windings 5 and the winding 6 a minimum. The winding 7 will set itself in such a position that its plane will be parallel to the plane of the winding 5, or, in other words, the flux due to the current in the windings 5 will pass straight through the windings 7 and in the same direction as the flux due to the windings 7. Under these conditions, a pointer (not shown) which is attached to the movable windings 6 and 7, will indicate unity power factor. When, however, the current and voltage in the circuit 1 are out of phase, the reaction between the windings 5 and the winding 7 will be less, and there will be an added reaction between the windings 5 and the winding 6. This reaction will compel the windings 6 and 7, which are mounted at right angles to each other, to take a new position. This new position is determined by the phase difference between the current and voltage in the circuit 1. Thus, since the windings 6 and 7 maintain a constant phase relation with each other, and since the value of the current in the windings 5, 6 and 7 does not affect the indication of the instrument, the power factor meter 4 will indicate correctly when the frequency, wave form or voltage of the circuit 1 changes.

Any form of phase converter may be employed, such as an induction motor or a motor generator set consisting of a single-phase motor and a polyphase generator, as is understood by those versed in the art.

My invention may be used for determining the phase difference between two single-phase circuits equally as well as for indicating the phase difference between the current and voltage in a circuit.

While I have shown my invention in its preferred form, it is not so limited, but is capable of various modifications, within the scope of the appended claims.

I claim as my invention:

1. A single-phase power-factor measuring device comprising a polyphase power-factor meter and an induction motor connected in operative relation thereto to convert single-phase voltage to polyphase voltage.

2. The combination with a single-phase circuit and a polyphase power-factor meter, of an induction motor operatively connected therebetween to split the single-phase voltage into polyphase voltage.

3. The combination with a single-phase circuit, of a plurality of current windings connected thereto, a plurality of potential windings, and an induction motor connected between the potential windings and the single-phase circuit.

4. A single-phase power-factor measuring device comprising a single-phase circuit, a polyphase power-factor meter and a polyphase induction motor interposed between the power-factor meter and the circuit for converting single-phase to polyphase voltage.

5. In a single-phase power-factor measuring device, the combination with a single-phase electric circuit and a polyphase power-factor meter, of an induction motor connected between the power-factor meter and the circuit for converting single-phase to polyphase potential.

6. In a single-phase power-factor measuring device, the combination with a single-phase circuit, of a plurality of current windings connected to the single-phase circuit, a plurality of potential windings, and a polyphase induction motor operatively connected between the potential windings and the single-phase circuit.

In testimony whereof, I have hereunto subscribed my name this 26th day of June, 1914.

BENJAMIN H. SMITH.

Witnesses:
W. L. WRIGHT,
B. B. HINES.

Copies of this patent may be obtained for five cents each, by addressing the "Commissioner of Patents, Washington, D. C."